March 1, 1932.  R. H. FIKE  1,847,336
SPRING TOOTH HARROW ATTACHMENT FOR PLOWS
Filed April 30, 1931  2 Sheets-Sheet 1
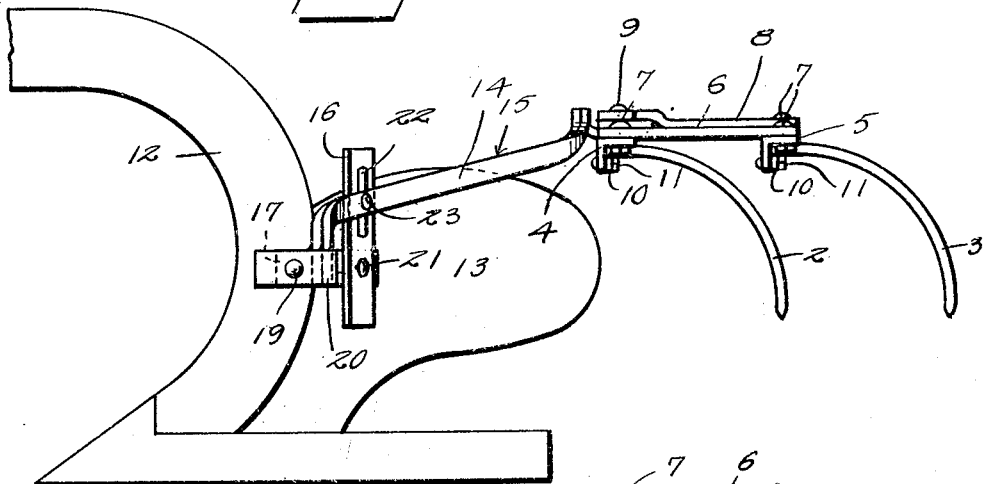
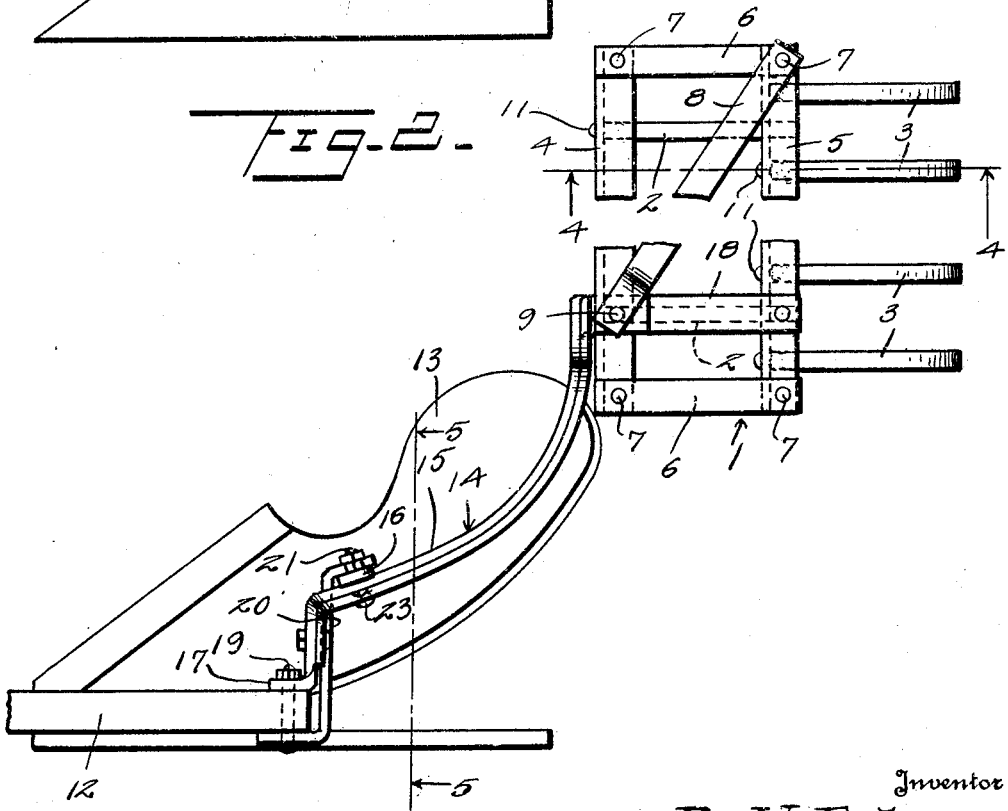
Inventor
R. H. Fike
By Watson E. Coleman
Attorney March 1, 1932. R. H. FIKE 1,847,336
SPRING TOOTH HARROW ATTACHMENT FOR PLOWS
Filed April 30, 1931 2 Sheets-Sheet 2
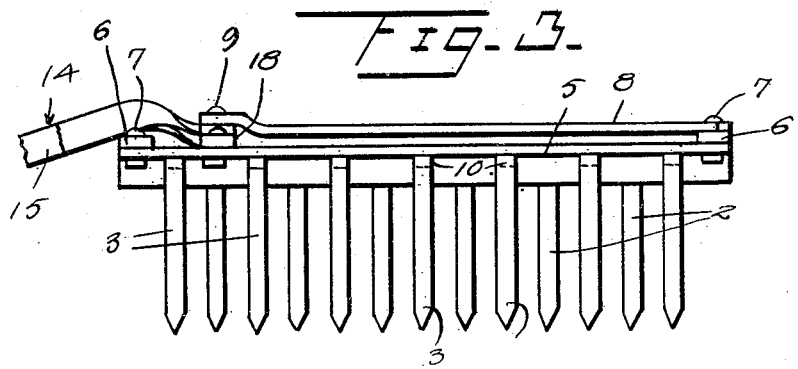
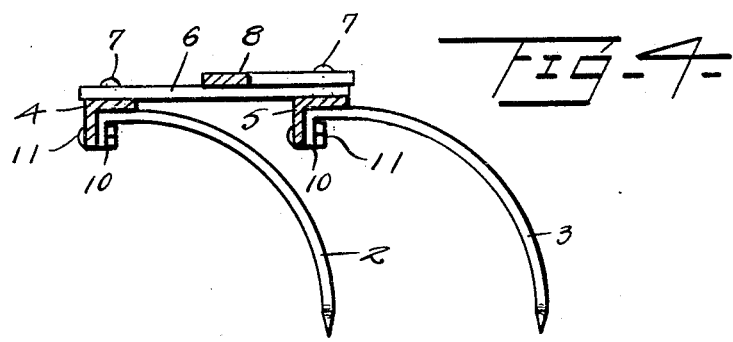
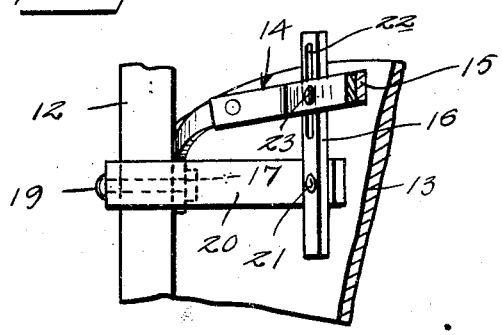
Inventor
R. H. Fike
By Watson E. Coleman
Attorney Patented Mar. 1, 1932

1,847,336

UNITED STATES PATENT OFFICE

ROY H. FIKE, OF HANSEN, IDAHO

SPRING TOOTH HARROW ATTACHMENT FOR PLOWS

Application filed April 30, 1931. Serial No. 534,040.

This invention relates to a harrow attachment for plows, and has for one of its objects to provide a novel and simple attachment of this character which shall embody a frame carrying rows of teeth, and a bracket for supporting the frame from a plow in such position with respect to the moldboard of the plow as to enable the teeth to work the soil as it is turned over.

The invention has for a further object to provide a harrow attachment of the character stated wherein one row of the teeth shall be arranged in advance of the other, wherein the rows of teeth shall extend transversely of the turned over soil, and wherein the teeth of the rear row shall be positioned laterally beyond the teeth of the front row, to the end that the turned over soil may be thoroughly worked.

The invention has for a further object to provide a harrow attachment of the character stated wherein the bracket shall be adapted to be secured to a plow of any suitable type without forming bolt receiving openings in any part of the plow, and wherein the bracket shall be adapted to be secured to the plow in a manner to permit the teeth to be adjusted vertically so that they may be set to penetrate turned over soil to the desired or required extent.

The invention is hereinafter more fully described and claimed, and illustrated in the accompanying drawings, wherein:—

Figure 1 is a view in side elevation illustrating the harrow attachment applied to a plow.

Figure 2 is a top plan view of the plow and harrow attachment.

Figure 3 is a view in rear elevation of the frame and teeth of the harrow attachment.

Figure 4 is a sectional view taken on the plane indicated by the line 4—4 of Figure 2, and Figure 5 is a sectional view taken on the plane indicated by the line 5—5 of Figure 2.

The harrow attachment comprises a frame 1, a front row of teeth 2 and a rear row of teeth 3. The frame 1 is of elongated rectangular formation in plan and comprises a front angle bar 4, a rear angle bar 5 and end bars 6. The bars 4, 5 and 6 are secured together by bolts 7, and are held against any relative angular movement by a diagonal brace 8 which extends from a point close to the inner end of the front bar 4 to the outer end of the rear bar 5 and which is secured to the front bar by a bolt 9 and to the rear bar by one of the bolts 7.

The front and rear bars 4 and 5 present horizontal and vertical members or flanges, and the vertical members or flanges extend downwardly from the front edges of the horizontal members or flanges. The spring harrow teeth 2 are secured in relatively spaced relation to the front bar 4, and the spring harrow teeth 3 are secured in relatively spaced relation to the rear bar 5, six front and seven rear teeth being preferably employed. The rear teeth 3 are arranged laterally beyond the front teeth 2. The teeth 2 and 3 curve downwardly and rearwardly from the bars 4 and 5, and are provided with angular upper end portions 10 which contact with the undersides of the horizontal members or flanges of the bars and with the rear sides of the front members or flanges of the bars and which are secured to the bar by bolts 11.

When it is in applied position, the harrow attachment is located close to the rear end of the moldboard and extends laterally outward therefrom. The harrow attachment is secured to and supported from the beam 12 and the moldboard 13 of the plow by a bracket 14 which comprises right angularly related arms 15 and 16. The bracket arm 15 extends from the beam 12 to the moldboard 13, and has a forwardly directed inner end portion 17 and a rearwardly directed outer end portion 18. The bracket arm portion 17 is secured to the beam 12 by a bolt 19 which secures the moldboard brace 20 to the beam. The bracket arm 16 is secured to the moldboard 13 by a bolt 21 which secures the brace to the moldboard. The frame 1 is secured to the bracket arm extension 18 by one of the bolts 7 and the bolt 9. The bracket 14 inclines upwardly, outwardly and rearwardly from its point of connection with the beam 12 to a point above and rearwardly of the rear end of the moldboard 13, and its angular rear end portion is located in a plane parallel to that of the beam so as to arrange the frame 1 and its teeth 2 and 3 transversely of the turned over soil. The bracket arm 16 extends upwardly from its point of connection with the moldboard 13, and is provided at its upper end portion with a vertical slot 22. The bracket arm 15 is secured to the bracket arm 16 by a bolt 23 carried by the bracket arm 15 and passing through the slot 22 of the bracket arm 16. The bracket arm 15 has a pivotal connection with the beam 12 so as to permit it to be adjusted to effect the raising or lowering of the harrow attachment and thus enable the harrow attachment to be supported from the plow with its teeth 2 and 3 at the required elevation.

The provision of the bracket arm 16 with the vertical slot 22 permits the adjustment of the bracket arm 15, and the bracket arm 15 is supported in its adjusted position from the bracket arm 16 by the bolt 23.

In view of the manner in which it is mounted upon the plow with respect to the moldboard thereof, the attachment will break up the soil as it is turned by the plow, thus enabling the simultaneous plowing and harrowing of the soil. The harrow attachment is strong and durable, may be manufactured at low cost, may be readily applied to a plow, and may be readily adjusted to set its teeth for penetration to the desired extent into the soil turned by the plow. While the harrow attachment is shown as applied to a one-way plow, it is to be understood that it may be applied to two-way plows, gang plows and the like.

While I have described the principle of the invention, together with the structure which I now consider the preferred embodiment thereof, it is to be understood that the structure shown is merely illustrative and that such changes may be made, when desired, as fall within the scope of the invention as claimed.

What is claimed is:—

A harrow attachment for a plow comprising a bracket arm adapted to be pivoted to a plow beam, a second bracket arm adapted to be fixed to the plow and provided with a vertical slot, said first bracket arm crossing said second bracket arm, a bolt connecting the bracket arms and passing through said slot, said first bracket arm being provided with a rearwardly directed extension, a frame secured between its ends to said bracket arm extension, and teeth carried by the frame, the pivotal connection of said first bracket arm with the plow and the provision of said second arm with a slot for the reception of the bolt permitting the first bracket arm to be adjusted with respect to the plow to raise and lower the frame and teeth.

In testimony whereof I hereunto affix my signature.

ROY H. FIKE.